US008849537B2

(12) United States Patent
Yoon

(10) Patent No.: US 8,849,537 B2
(45) Date of Patent: Sep. 30, 2014

(54) CONTROL SYSTEM AND METHOD OF VEHICLE USING IN-WHEEL MOTOR

(75) Inventor: Sangyon Yoon, Yongin (KR)

(73) Assignee: Hyundai Motor Company, Seoul (KR)

( * ) Notice: Subject to any disclaimer, the term of this patent is extended or adjusted under 35 U.S.C. 154(b) by 302 days.

(21) Appl. No.: 13/312,696

(22) Filed: Dec. 6, 2011

(65) Prior Publication Data

US 2013/0030601 A1 Jan. 31, 2013

(30) Foreign Application Priority Data

Jul. 28, 2011 (KR) .................. 10-2011-0075160

(51) Int. Cl.
*B60T 7/12* (2006.01)
*G05D 1/00* (2006.01)
*G06F 7/00* (2006.01)
*G06F 17/00* (2006.01)
*B60W 30/02* (2012.01)
*B60W 10/184* (2012.01)
*B60W 10/08* (2006.01)
*B60K 7/00* (2006.01)
*B60W 30/04* (2006.01)
*B60W 50/00* (2006.01)

(52) U.S. Cl.
CPC ......... *B60W 30/02* (2013.01); *B60W 2720/125* (2013.01); *B60W 2520/28* (2013.01); *B60W 2540/18* (2013.01); *B60W 2520/14* (2013.01); *B60W 2720/14* (2013.01); *B60K 7/0007* (2013.01); *B60W 2710/083* (2013.01); *B60W 2720/30* (2013.01); *B60W 10/184* (2013.01); *B60W 2520/125* (2013.01); *B60W 10/08* (2013.01); *B60W 2030/043* (2013.01); *B60W 2050/0012* (2013.01); *B60W 2520/10* (2013.01); *B60W 30/04* (2013.01)

USPC ......... 701/82; 701/1; 701/71; 701/90; 701/91

(58) Field of Classification Search
None
See application file for complete search history.

(56) References Cited

U.S. PATENT DOCUMENTS

| 4,913,258 | A | * | 4/1990 | Sakurai et al. ............... 180/242 |
| 5,343,971 | A | * | 9/1994 | Heidelberg et al. ...... 180/65.245 |
| 5,376,868 | A | * | 12/1994 | Toyoda et al. ............... 318/587 |
| 5,465,806 | A | * | 11/1995 | Higasa et al. ................ 180/165 |
| 5,492,192 | A | * | 2/1996 | Brooks et al. ................ 180/165 |
| 5,508,924 | A | * | 4/1996 | Yamashita ...................... 701/22 |
| 5,615,933 | A | * | 4/1997 | Kidston et al. ............... 303/152 |

(Continued)

FOREIGN PATENT DOCUMENTS

| JP | 2008-167640 | | 7/2008 |
| JP | 2010-259294 | | 11/2010 |
| JP | 2011073534 | A | 4/2011 |
| KR | 10-2009-0062321 | | 6/2009 |

*Primary Examiner* — Bhavesh V Amin
(74) *Attorney, Agent, or Firm* — Edwards Wildman Palmer LLP; Peter F. Corless

(57) ABSTRACT

Disclosed is a technique for controlling the stability of a vehicle via in-wheel motors. More specifically, a steering angle, a wheel speed, a lateral G-Force, and a yaw rate calculated, and the lateral G-Force is compared with a predetermined lateral G-Force threshold. Next, a predetermined yaw rate control threshold is compared with a difference between an actual yaw rate and a demand yaw rate based on the calculated steering angle and wheel speed. The demand yaw rate and the actual yaw rate are then compared when the difference between the demand yaw rate and the actual yaw rate is greater than the yaw rate control threshold, and a final torque value is generated according to the difference between the demand yaw rate and the actual yaw rate.

12 Claims, 3 Drawing Sheets

(56) References Cited

U.S. PATENT DOCUMENTS

| | | | |
|---|---|---|---|
| 5,973,463 A * | 10/1999 | Okuda et al. | 318/430 |
| 5,982,063 A * | 11/1999 | Lutz et al. | 310/77 |
| 6,704,622 B2 * | 3/2004 | Tinskey et al. | 701/1 |
| 6,885,931 B2 * | 4/2005 | Anwar | 701/72 |
| 6,909,959 B2 * | 6/2005 | Hallowell | 701/88 |
| 7,072,751 B2 * | 7/2006 | Shimizu | 701/36 |
| 7,440,834 B2 * | 10/2008 | Yamaguchi et al. | 701/69 |
| 7,441,845 B2 * | 10/2008 | Crombez et al. | 303/152 |
| 7,455,142 B2 * | 11/2008 | Post, II | 180/197 |
| 7,530,416 B2 * | 5/2009 | Suzuki | 180/65.51 |
| 8,321,088 B2 * | 11/2012 | Brown et al. | 701/38 |
| 8,521,349 B2 * | 8/2013 | Yu et al. | 701/22 |
| 8,556,012 B2 * | 10/2013 | Kim | 180/65.51 |
| 2004/0176899 A1 * | 9/2004 | Hallowell | 701/84 |
| 2006/0076828 A1 * | 4/2006 | Lu et al. | 303/146 |
| 2007/0257570 A1 * | 11/2007 | Walter et al. | 310/67 R |
| 2008/0029328 A1 * | 2/2008 | Hoeck et al. | 180/248 |
| 2008/0082246 A1 * | 4/2008 | Brown et al. | 701/91 |
| 2011/0238251 A1 * | 9/2011 | Wright et al. | 701/22 |
| 2013/0030601 A1 * | 1/2013 | Yoon | 701/1 |

* cited by examiner

CONTROL SYSTEM AND METHOD OF VEHICLE USING IN-WHEEL MOTOR

CROSS-REFERENCE TO RELATED APPLICATION

This application claims priority to and the benefit of Korean Patent Application No. 10-2011-0075160 filed in the Korean Intellectual Property Office on Jul. 28, 2011, the entire contents of which are incorporated herein by reference.

BACKGROUND OF THE INVENTION (a) Field of the Invention

The present invention relates to a vehicle control system and method which utilizes an in-wheel motor. More particularly, the present invention relates to a vehicle control system and method for controlling a posture or stability of a vehicle by using a lateral G-Force, a yaw rate, etc.

(b) Description of the Related Art

Recently, automotive manufactures have begun to focus on automotive control systems which aide the driver in controlling and driving the vehicle in order to help prevent accidental collisions. For example, electronic stability control (ESC), which has been developed from an anti-lock brake system (ABS) and traction control system (TCS) is one type of systems which has drawn recent attention.

The ESC system prevents a vehicle from leaving the road when the driver of a vehicle loses control while driving around a corner, on slippery road, or attempting to avoid an obstacle on the road. In this system, a driving wheel, a steering wheel, and a plurality of sensors are operated to automatically compensate for unstable posture or instability identified in the vehicle. That is, a separate system such as an ECS is necessary so as to ensure the stability of the vehicle body during driving.

However, in the current ESC systems the lining of a brake is quickly worn away due to the system consistently operating the brakes, especially in commercial vehicles. Additionally, the current systems are overly complicated because a separate ESC module and engine control unit (ECU) for controlling the ESC must to be disposed therein.

The above information disclosed in this Background section is only for enhancement of understanding of the background of the invention and therefore it may contain information that does not foam the prior art that is already known in this country to a person of ordinary skill in the art.

SUMMARY OF THE INVENTION

The present invention has been made in an effort to provide a system and method for securely controlling the stability of a vehicle through an in-wheel motor system without the use of an electronic stability control (ESC) system.

The exemplary embodiment of the present invention uses the ECU to calculate a steering angle, a wheel speed, a lateral G acceleration (G-force), and a yaw rate, compares the lateral G-Force with a predetermined lateral acceleration threshold, compares a predetermined yaw rate control threshold with a difference between an actual yaw rate and a demand yaw rate that a driver requires according to the steering angle and the wheel speed, compares the demand yaw rate and the actual yaw rate when the difference between the demand yaw rate and the actual yaw rate is larger than the yaw rate control threshold, and generates a final torque value according to the difference between the demand yaw rate and the actual yaw rate which is a applied to at least one wheel on the vehicle by an in-wheel motor.

If the lateral G-force is larger than a predetermined value, roll stability control is operated to deteriorate the torque applied. The torque deterioration may be operated by a predetermined torque reduction factor ($D_{RSC}$) according to the difference between the actual lateral G-Force and the lateral G-Force threshold.

An oversteer condition may be identified by the system when the demand yaw rate is larger than the actual yaw rate, and a feed-forward torque of an outer wheel is generated by subtracting a braking torque value from a driving torque of an outer wheel. Conversely, an understeer condition may be identified by the controller when the demand yaw rate is less than the actual yaw rate, and a feed-forward torque of an inner wheel is then generated by subtracting a braking torque value from a driving torque of an inner wheel.

In the illustrative embodiment of the present invention, the steering angle may be calculated by a sensor value of a steering device. The wheel speed may be calculated by a position sensor of the in-wheel motor. The lateral G-Force may be calculated by a relation between an output torque and a torque of a right wheel and a left wheel. The yaw rate may be calculated by a relation between the lateral G-Force and a vehicle speed.

In an exemplary embodiment of the present invention, the conventional ESC system is replaced by an in-wheel system to improve stability and to reduce costs. Also, a yaw control function of the conventional ESC that is typically operated by a brake is replaced with a drive motor to improve the durability and cost effectiveness of the brake. However, the above illustrative embodiments can also be applied to a stability control system which brakes each wheel individually without departing from the overall concept and novelty of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

DETAILED DESCRIPTION OF THE EMBODIMENTS

Hereinafter, with reference to the accompanying drawings, the present invention will be described in order for those skilled in the art to be able to implement the invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

A steering angle, a wheel speed, lateral G-Force, and a yaw rate are measured by a controller to provide increased stability in a vehicle. The lateral G-Force is compared with a predetermined lateral G-Force threshold, and it is determined whether a driving condition is an understeer or an oversteer situation based on a difference between a demand yaw rate and an actual yaw rate to calculate a final torque value in an exemplary embodiment of the present invention.

First, a vehicle body stability control apparatus (electronic stability control, hereinafter ESC) is a driver assistance system that monitors slip conditions or rollover conditions of a running vehicle and controls engine output and wheel brakeage in order to improve stability of the vehicle and thereby prevent accidents from occurring. Conventional ESC systems have generally applied pressure to a disk brake of a wheel when instability is detected. Furthermore, in the conventional ESC system the amount of engine torque controlled and brakes were applied to secure lateral direction stability.

Figure 3:
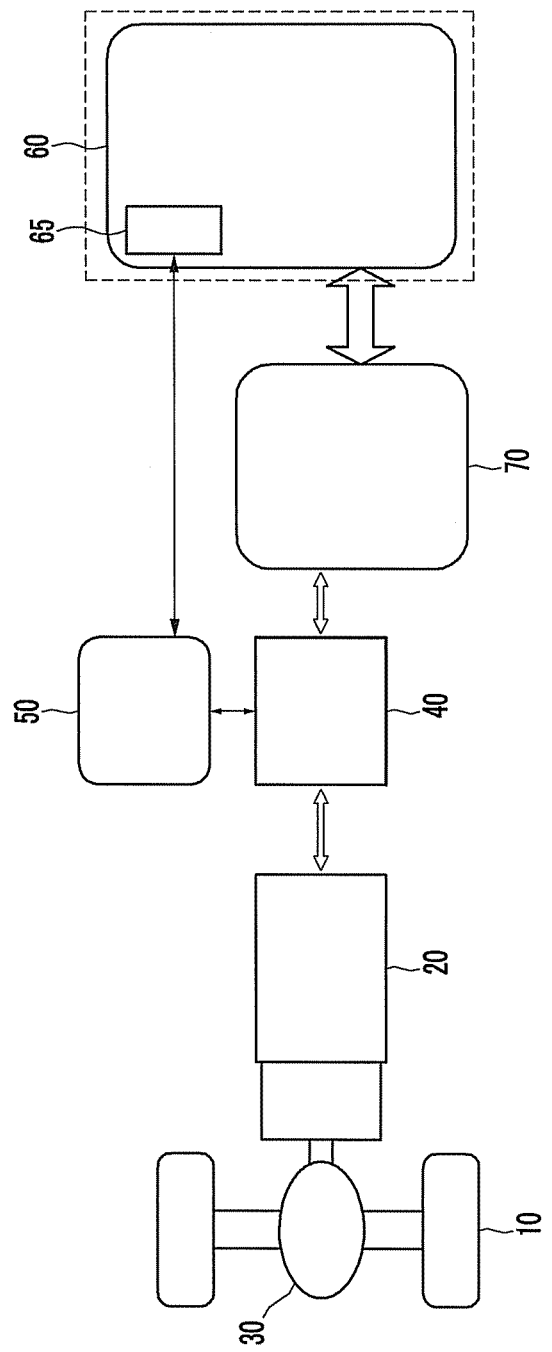
FIG. 3 is a schematic diagram showing a position of a motor of a conventional vehicle.

FIG. 3 is a schematic diagram showing a vehicle having a conventional motor in an electric vehicle such as an environmentally friendly vehicle, for example a conventional hybrid vehicle (hybrid electric vehicle, HEV) and a hydrogen fuel cell vehicle (fuel cell electric vehicle, FCEV), wherein a battery 60 and a battery controller 65 supply power to a power distribution unit 70, driving torque is distributed to a motor 20 through a motor controller 40, and the distributed driving torque is distributed to each wheel 10 through an axle 30.

Figure 1:
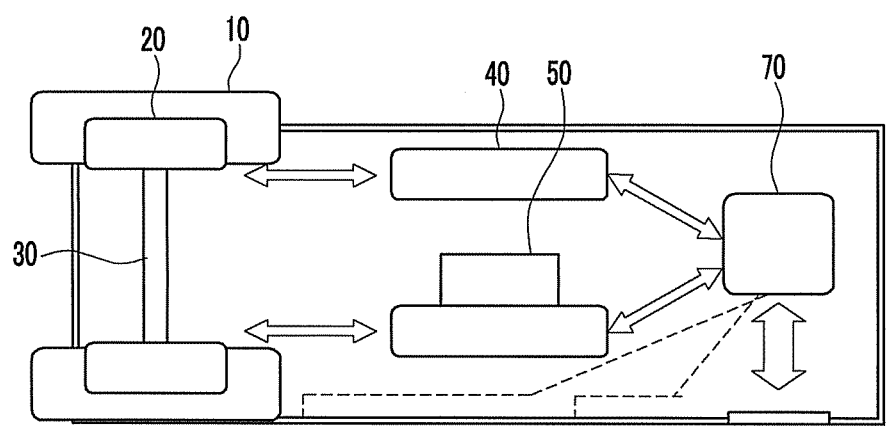
FIG. 1 is a schematic diagram of a vehicle having a general in-wheel motor.

FIG. 1 is a schematic diagram showing a vehicle having an in-wheel motor 20, wherein the in-wheel motor 20 directly supplies driving power to its corresponding wheel 10. In this illustrative embodiment of the present invention, the motor controller (motor control unit, hereinafter MCU) 40 is configured to transmit different power amounts/signals based upon signals received from high-rank controller (vehicle control unit, hereinafter VCU) 50 to each wheel 10. In this case, the power is distributed by a power distribution unit (PDU) 70.

Also, since the in-wheel motor signifies that the motor 20 is basically disposed in the wheel 10, the capacity of the brake thereof is restricted and regenerative braking force is actively used. Because the response characteristic of the motor is very fast (i.e., milliseconds), the usage of the regenerative braking force is efficient as well.

Figure 2:
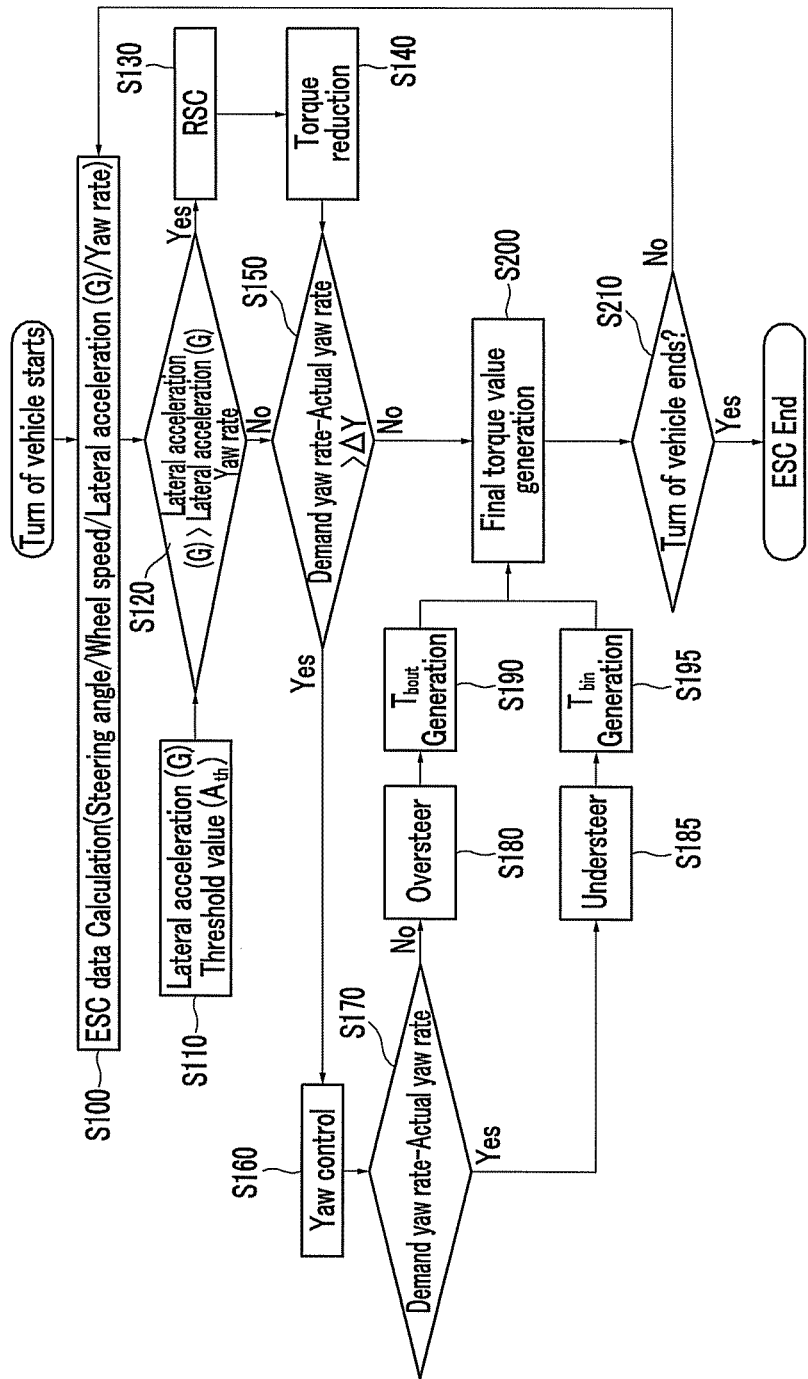
FIG. 2 is a flowchart for controlling a vehicle according to an exemplary embodiment of the present invention.

Hereinafter, referring to FIG. 2, a system and method for controlling a vehicle having an in-wheel motor will be described according to an exemplary embodiment of the present invention. Data such as a steering angle, a wheel speed, a yaw rate, and lateral G-Force are calculated in S100. The steering angle is calculated by sensor values of a steering device. The steering angle is a rotational degree of a vehicle that a driver requires in a normal driving condition (the degree at which a steel wheel is turned and the degree at which the wheel are turned). The wheel speed, the yaw rate, and the lateral G-Force can be calculated by the in-wheel system. The wheel speed can be calculated by sensors, e.g., a resolver sensor of the in-wheel motor. The lateral G-Force can be calculated by using a torque estimation function of the motor controller.

Also, the motor controller can calculate input power through a current or voltage sensor of a DC input portion, and uses a relation between torque of a right wheel and a left wheel and an output torque of an engine to be able to calculate a lateral G-Force in Equation 1 below.

$$T_{RH} - T_{LH} = \frac{d}{dt}(J\omega) \quad (1)$$
$$= J\frac{d\omega}{dt} + \omega\frac{dJ}{dt}$$
$$= J\frac{d^2\theta}{d^2t} + \frac{d\theta}{dt}\frac{dJ}{dt}$$

In the above equation, ω and $$\frac{d\theta}{dt}$$

are wheel speed and angle speed, $$\frac{d^2\theta}{d^2t}$$

is the lateral G-Force, $T_{RH}$ is the right wheel torque, and $T_{LH}$ is the left wheel torque. Also, J is an inertia factor. The $T_{RH}$ and $T_{LH}$ are measured by an inverter installed in the vehicle.

In addition, the yaw rate (rotation rate) may be calculated from the lateral G-Force and the vehicle speed (wheel speed). That is, the yaw rate may be calculated by dividing the lateral G-Force by the vehicle speed. Then, the measured lateral G-Force ($A_{latt}$) is compared with a lateral G-Force threshold value ($A_{th}$) that is input in S110 in S120, wherein the lateral G-Force threshold value is data that is tabled by a steering angle, a wheel speed, etc.

If the measured lateral G-Force is larger/greater than the lateral G-Force threshold value in S120, it is determined by the controller that the vehicle in danger of being overturned and a vehicle overturn prevention system (roll stability control, hereinafter RSC) is applied in S130. The RSC system deteriorates torque. That is, a predetermined torque reduction factor ($D_{RSC}$) is multiplied by a torque command value (T command) of an in-wheel motor to reduce torque according to a difference between the lateral G-Force threshold value and the lateral G-Force such that rolling of the vehicle is reduced in S140.

If the measured lateral G-Force is less than the lateral G-Force threshold value or the torque is reduced by the RSC system, a difference between the demand yaw rate ($Y_{dr}$) and the actual yaw rate ($Y_{veh}$) is compared with a predetermined yaw rate control threshold (Y) in S150.

The demand yaw rate is data that is tabled based on the steering angle and the wheel speed, and the actual yaw rate is an actual yaw rate of the vehicle. If the difference between the demand yaw rate and the actual yaw rate is greater than a predetermined yaw rate control threshold value in S150, yaw control is performed in S160.

The demand yaw rate is compared with the actual yaw rate during the yaw control in S170, if the demand yaw rate is larger than the actual yaw rate, it is determined that a vehicle is in an understeer condition in S185 and a braking torque of an inner wheel is deducted from a driving torque ($T_{in}$) of an inner wheel to generate a compensated feed-forward torque ($T_{bin}$) of an inner wheel in S195 such that the yaw rate becomes a value that a driver demands, and if the demand yaw rate is less than the actual yaw rate, it is determined that a vehicle is in an oversteer condition in S180, so a braking torque value of an outer wheel is deducted from a driving torque ($T_{out}$) of an outer wheel to generate a feed-forward torque ($T_{out}$) of an outer wheel in S190.

The feed-forward torque ($T_{bin}$, $T_{bout}$) of the outer wheel or the inner wheel can be a final torque value, and if the lateral G-Force is less than the lateral G-Force threshold value and the difference between the demand yaw rate and the actual yaw rate is less than a yaw rate control threshold in S120 and S150, a first torque order value can be a final torque value in S200. Also, when the torque is deteriorated in S140, if the difference between the demand yaw rate and the actual yaw rate is less than a yaw rate control threshold value, the deteriorated torque value can be a final torque value in S200.

The difference between the demand yaw rate and the actual yaw rate is a torque for which yaw rate control is not necessary in S150, and a final torque value of an inner wheel and an outer wheel is generated in S200. That is, when the yaw rate control is necessary to control a yaw, the feed-forward torque ($T_{bin}$, $T_{bout}$) of the inner wheel and the outer wheel becomes the final torque, however, when the yaw rate control is not necessary, the deteriorated torque value of S140 or the first torque order value can be the final torque value. If the vehicle is controlled by the final torque, the turn control of the vehicle ends in S210 such that the vehicle securely maintains its movement.

Furthermore, the control logic of the present invention may be embodied as computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

10: wheel
20: motor
30: axle
40: motor control unit (MCU)
50: vehicle control unit (VCU)
60: battery
65: battery controller (BMS)
70: power distribution unit (PDU)

What is claimed is:

1. A vehicle control method using in-wheel motor, comprising:
calculating, a controller, a steering angle, a wheel speed, a lateral G-Force, and a yaw rate to operate an electronic stability control system via the plurality of in-wheel motors, wherein steering angle is calculated by a sensor value output by a steering device, the wheel speed is calculated by a position sensor in an in-wheel motor of a plurality of in wheel motors, a lateral acceleration is calculated by a torque of a right wheel and left wheel of the vehicle, and a yaw rate is calculated by dividing the lateral acceleration by a vehicle speed;
comparing, by the controller, the lateral G-Force with a predetermined lateral acceleration threshold;
comparing, by the controller, a predetermined yaw rate control threshold with a difference between an actual yaw rate and a demand yaw rate that a driver demands according to the steering angle and the wheel speed;
comparing, by the controller, the demand yaw rate and the actual yaw rate when the difference between the demand yaw rate and the actual yaw rate is larger than the yaw rate control threshold;
generating, by the controller, a final torque value according to the difference between the demand yaw rate and the actual yaw rate; and
controlling torque of the plurality of in-wheel motors based on the final torque value.

2. The vehicle control method of claim 1, wherein when the lateral G-Force is greater than a predetermined value, roll stability control is operated, by the controller, to deteriorate torque.

3. The vehicle control method of claim 2, wherein the torque deterioration is operated by a predetermined torque reduction factor (DRSC) according to the difference between the actual lateral G-Force and the lateral G-Force threshold.

4. The vehicle control method of claim 1, wherein the controller determines that an oversteer condition is present when the demand yaw rate is greater than the actual yaw rate, and in response, a feed-forward torque of an outer wheel is generated by subtracting a braking torque value from a driving torque of the outer wheel.

5. The vehicle control method of claim 1, wherein the controller determines that an understeer condition is present, when the demand yaw rate is less than the actual yaw rate, and in response, a feed-forward torque of an inner wheel is generated by subtracting a braking torque value from a driving torque of the inner wheel.

6. A system, comprising:
a plurality of sensors configured to detect and identify a steering angle, a wheel speed, a lateral G-Force, and a yaw rate;
an in-wheel motor installed in each wheel of a vehicle, the in-wheel motor configured to selectively apply torque to its corresponding wheel;
a controller configured to calculate the steering angle, the wheel speed, the lateral G-Force, and the yaw rate based on data received from the plurality of sensors to operate an electronic stability control system via the plurality of in-wheel motors, compare the lateral G-Force with a predetermined lateral acceleration threshold, compare a predetermined yaw rate control threshold with a difference between an actual yaw rate and a demand yaw rate that a driver demands according to the steering angle and the wheel speed, compare the demand yaw rate and the actual yaw rate when the difference between the demand yaw rate and the actual yaw rate is larger than the yaw rate control threshold, generate a final torque value according to the difference between the demand yaw rate and the actual yaw rate, controlling torque of the plurality of in-wheel motors based on the final torque value,
wherein steering angle is calculated by a sensor value output by a steering device, the wheel speed is calculated by a position sensor in an in-wheel motor of a plurality of in wheel motors, a lateral acceleration is calculated by a torque of a right wheel and left wheel of the vehicle, and a yaw rate is calculated by dividing the lateral acceleration by a vehicle speed.

7. The system of claim 6, wherein when the lateral G-Force is greater than a predetermined value, the controller is further configured to operate roll stability control to deteriorate torque.

8. The system of claim 7, wherein the torque deterioration is operated by a predetermined torque reduction factor (DRSC) according to the difference between the actual lateral G-Force and the lateral G-Force threshold.

9. The system of claim 6, wherein the controller is configured to determine that an oversteer condition is present when the demand yaw rate is greater than the actual yaw rate, and in response, a feed-forward torque of an outer wheel is generated by subtracting a braking torque value from a driving torque of the outer wheel.

10. The system of claim 6, wherein the controller is further configured to determine that an understeer condition is present, when the demand yaw rate is less than the actual yaw rate, and in response, a feed-forward torque of an inner wheel is generated by subtracting a braking torque value from a driving torque of the inner wheel.

11. A computer readable medium containing executable program instructions executed by a controller, comprising:
   program instructions that calculate the steering angle, the wheel speed, the lateral G-Force, and the yaw rate based on data received from a plurality of sensors to operate an electronic stability control system via the plurality of in-wheel motors, wherein steering angle is calculated by a sensor value output by a steering device, the wheel speed is calculated by a position sensor in an in-wheel motor of a plurality of in wheel motors, a lateral acceleration is calculated by a torque of a right wheel and left wheel of the vehicle, and a yaw rate is calculated by dividing the lateral acceleration by a vehicle speed;
   program instructions that compare the lateral G-Force with a predetermined lateral acceleration threshold;
   program instructions that compare a predetermined yaw rate control threshold with a difference between an actual yaw rate and a demand yaw rate that a driver demands according to the steering angle and the wheel speed;
   program instructions that compare the demand yaw rate and the actual yaw rate when the difference between the demand yaw rate and the actual yaw rate is larger than the yaw rate control threshold;
   program instructions that generate a final torque value according to the difference between the demand yaw rate and the actual yaw rate; and
   program instructions that control torque of the plurality of in-wheel motors based on the final torque value.

12. The computer readable medium of claim 11, wherein when the lateral G-Force is greater than a predetermined value, the program instructions operate roll stability control to deteriorate torque.

* * * * *